3,440,943
MIRROR REFLEX CAMERA WITH FOCAL PLANE SHUTTER
Edgar Sauer, Stuttgart-Rohr, Germany, assignor to Zeiss Ikon Aktiengesellschaft, Stuttgart, Germany, a corporation of Germany
Filed Aug. 24, 1966, Ser. No. 574,656
Claims priority, application Germany, Sept. 1, 1965, Z 11,731
Int. Cl. G03b 9/40
U.S. Cl. 95—57　　　　　　　　　　　　　　3 Claims

ABSTRACT OF THE DISCLOSURE

A mirror reflex camera with a focal plane shutter is constructed in such a manner that it may be loaded with a film cartridge comprising two spaced film spool chambers connected with each other by a bridge which comes to lie in the focal plane of the camera and along which the film is moved from one chamber into the other. The focal plane shutter is provided with shutter members which move in a direction perpendicular to the direction in which the film is moved by a scanning member which is arranged in the lower part of the camera casing. Another scanning member which engages a film speed indicating mark on the cartridge is also arranged in the lower part of the camera casing. When a conventional film cartridge is to be used, it has to be inserted upside down into the camera casing in order to be properly engaged by the two mentioned scanning members.

---

The invention relates to a mirror reflex camera which is provided with a focal plane shutter. It is an object of the invention to construct such a camera in a manner that it may be employed for the use of film cartridges which are provided on both ends between the picture window with forwardly projecting film spool chambers.

The employment of such film cartridges requires the cooperation of the cartridge with mechanisms provided in the camera, and which have the purpose to control the advancing movement of the film in a manner to prevent double exposures. Furthermore, the film cartridge is provided with marks which cooperate with other parts in the camera in order to adjust the camera mechanism for the emulsion speed of the film which is in the film cartridge.

The problem in the solution of this object of the invention resides in this, that the forwardly projecting film spool chambers of the cartridge normally make it difficult to properly arrange the focal plane shutter which is to be disposed in the immediate neighborhood of the picture plane in which the film moves along the cartridge bridge because the curtains of the focal plane shutter usually move parallel to the film advancing mechanism. The solution of this problem would require that the entire shutter mechanism of the camera has to be displaced a considerable distance forwardly, and this would result in an increase in the depth of the camera and an increase of intersection of rays passing through the camera objective.

According to the present invention, the above-mentioned difficulties are overcome, and a mirror reflex camera is created having a focal plane shutter in which for the purpose of employing film cartridges with forwardly projecting film spool chambers, which are connected with each other by a film movement bridge, a focal plane shutter is provided in which the curtains move at a right angle to the direction of the film advancing mechanism. If this is done, then the shutter parts may be arranged in the space between the film spool chambers in the immediate neighborhood of the picture plane, whereby rollers associated with the focal plane shutter are arranged with their axes parallel to the camera top wall and bottom wall respectively, and on the other hand, the two tensioning rollers, according to a further object of the invention, are arranged between the upper wall of the cartridge and the viewfinder ocular, while the two lower rollers, which contain springs, are arranged between the light chamber and the operating member which controls the film advancing movement.

The above-mentioned mechanism which controls the film speed adjusting mechanism causes another difficulty when film cartridges of the mentioned type are employed in mirror reflex cameras. This difficulty consists in this that in accordance with the arrangement of the film speed marks and the scanning aperture on the top wall of the cartridges, it is necessary to arrange the mechanism for scanning the marks in the upper part of the camera. This is, however, not possible in mirror reflex cameras because the upper side of the camera is used for the arrangement of the viewfinder comprising a field lens, focusing disc, roof top prism and the like. If in addition to these parts the mentioned film speed marks and film advancing mechanism would be arranged in the upper part of the camera, the dimensions of the camera would be unduly enlarged.

In accordance with the invention, this problem is solved in that the mentioned mechanism for scanning the film speed marks is arranged in the lower portion of the camera, and this requires that the film cartridge compared with its standard use has to be rotated about an angle of 180°, or in other words, the film camera cartridge has to be arranged upside down in this camera.

The fact that this reversed insertion of the film cartridge with its film speed marks and indication of type of film and picture number, which appear on the rear wall of the cartridge, will be disposed upside down when the camera is being used, may be eliminated by temporarily reversing the camera and then viewing the mentioned indications in a correct position.

With these and other objects in view, the invention will now be described with reference to the accompanying drawing, in which FIG. 1 illustrates a centrally disposed vertical sectional view of the complete camera;

Figure 1:
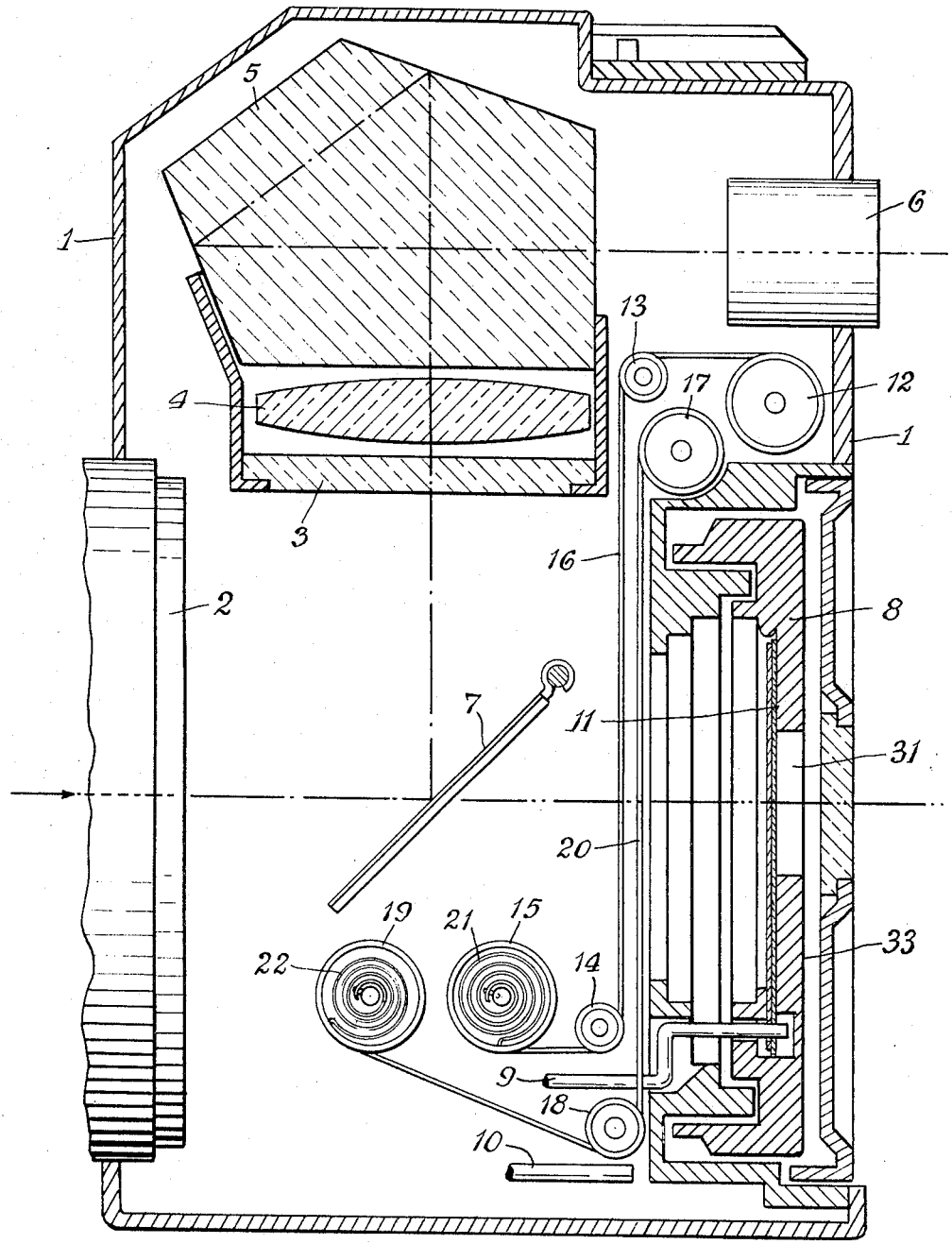

Referring to the drawing and particularly to FIG. 1, the camera casing 1 is provided on its front wall with a camera objective of which only the rear mount 2 is illustrated. This rear mount 2 is also adapted to receive any one of a number of exchangeable camera objectives. The top portion of the camera 1 has mounted therein a viewfinder comprising a focusing disc 3, a picture field lens 4, a roof top prism 5 and an ocular 6 which is only diagrammatically indicated. Within the camera casing is also arranged the customary mirror 7 which during the picture taking procedure is pivotally moved upwardly so that the light rays passing through the camera objective may reach the light-sensitive film arranged in the plane 11. This plane 11 is disposed within the film cartridge 8 inserted from the rear into the camera casing 1. 9 indicates a portion of the film advancing mechanism which projects into the film cartridge 8 for moving therein the film step by step. With 10 is indicated a portion of the film speed scanning mechanism which engages an indicating mark provided on the film cartridge 8 and which transfers the meaning of this mark into the camera mechanism which serves the function of adjusting the camera mechanism for the particular speed of the film which is arranged in the film cartridge 8. It will be noted from the particular position of the film cartridge that the latter has been rotated 180°, or in other words, the top wall of the film cartridge is arranged near the bottom wall of the camera casing.

Figure 2:
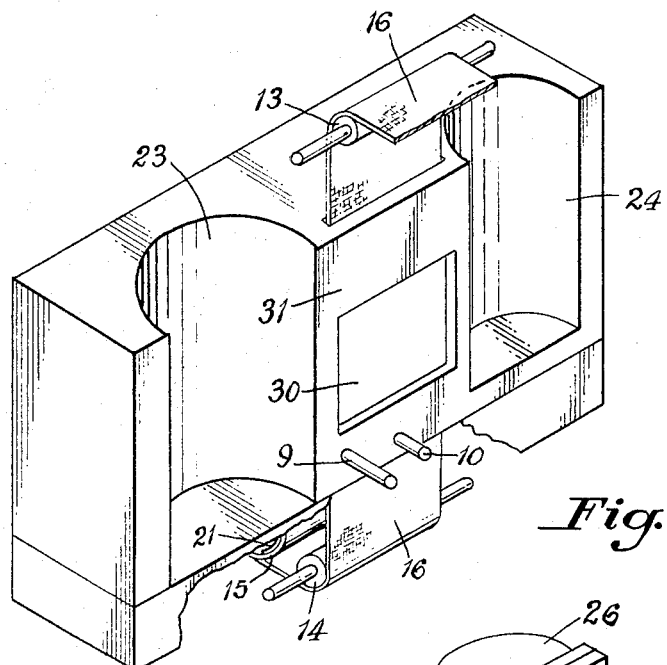
FIG. 2 illustrates diagrammatically in a perspective rear view the camera body without the camera objective and without the viewfinder system.

The rollers for the focal plane shutter are arranged in part of the camera, preferably in the space between the viewfinder and the upper portion of the film cartridge, and partly they are arranged in the lower part of the camera, preferably in the space below the reflex mirror 7. It will be noted that in this position of the focal plane shutter, as particularly illustrated in FIG. 2, the curtains of the focal plane shutter move in a vertical direction and at right angles to the horizontal film movement effected by the film advancing mechanism. The curtains travel in the space between the recessed cartridge chambers 23, 24 provided in the camera body directly adjacent the picture window wall 31 and the bridge of the film cartridge. The film moves over the picture window 30 in the wall 31. In particular the rollers 12, 13, 14 and 15 are associated with one curtain 16, and the rollers 17, 18 and 19 are associated with the second curtain 20. This particular arrangement of the focal plane shutter eliminates an enlargement of the conventional depth of the camera, and it is possible to employ the camera with objectives of conventional and shorter distances between back plane of the lens and image plane. The lower curtain takeup rollers 15 and 19 are each provided with a tension spring 21 and 22 respectively.

Figure 3:
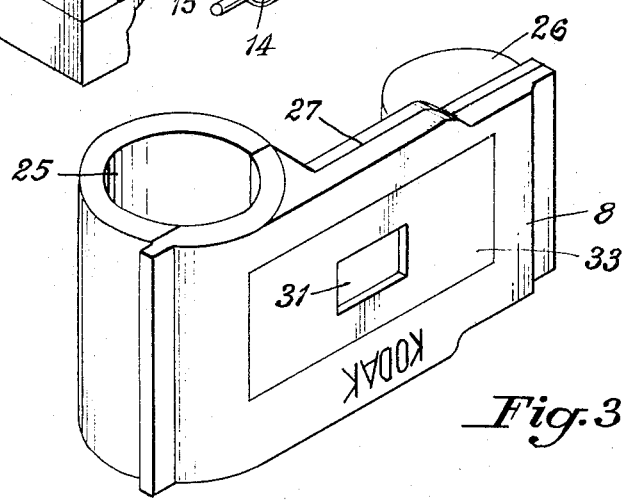
FIG. 3 illustrates diagrammatically a rear view of the film cartridge in its inverted position in which it is inserted in the camera.

FIG. 3 illustrates a film cartridge, such as a KODAPAK cartridge 8 which may be used with the mirror reflex camera of the invention and in the illustrated upside down position is inserted in the camera. The left-hand film spool chamber 25 is larger and receives the exposed film and is adapted to be received by the larger recess 23 of the camera. The right-hand film spool chamber 26 which contains the unexposed film is smaller in height than the chamber 25 and also has a smaller diameter than the latter. This smaller film spool chamber 26 is received by the correspondingly dimensioned recess 24 in the camera. The different sizes of the film spool chambers prevent a wrong insertion of the cartridge in the camera. The two film spool chambers 25 and 26 are connected with each other by straight bridge portion, the center line, which indicates the picture plane, is indicated by the line 27. The film moves horizontally from the chamber 26 to the chamber 25. The rear wall 33 of the cartridge 8 is provided with a window 31 in which appear picture numbers which are arranged on a backing strip on which the film is attached.

Figure 4:
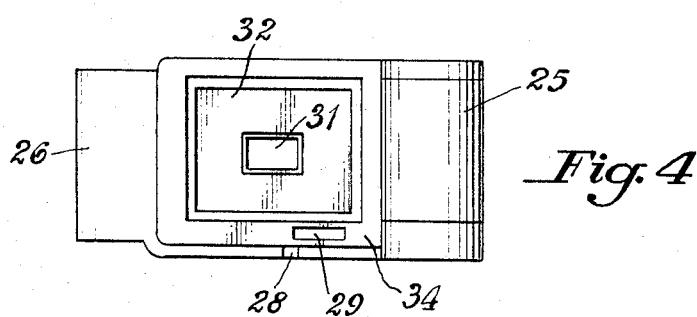
FIG. 4 is a front view of the empty film cartridge when viewing it from the objective side of the camera.

Referring to FIG. 4, which is a view of the cartridge from the camera lens, the picture window is indicated with 32. A slot 29 in the front wall 34 permits the entrance of the member 9 of film advancing mechanism into a perforation in the film to arrest its further advance, and the recess 28 in the edge of the cartridge indicates by its position the film speed of the film in the camera. This mark or recess 28 is engaged by the scanning member 10.

What I claim is:

1. In a mirror reflex camera, the combination comprising: a focal plane shutter, a film cartridge provided with means forming two laterally spaced forwardly projecting film spool chambers, and a bridge connecting said film spool chamber forming means with each other and along which bridge a film is adapted to be moved from one chamber into the other, said focal plane shutter including shutter members which move in a direction perpendicular to the direction in which the film in said cartridge is movable; a camera casing having a camera body provided with top and bottom walls and means forming recessed chambers in said camera body for receiving said film spool chamber forming means of said cartridge; finder elements arranged in the upper part of said camera casing, a first scanning means for a film advancing mechanism, a second scanning means for the film speed, and rollers for said focal plane shutter, the axes of rotation of said rollers being disposed parallel to the top wall and bottom wall of the camera casing, two of said rollers being arranged below said finder elements and above said film cartridge and two other rollers being arranged in the lower part of said camera casing above said first scanning means for said film advancing mechanism.

2. A mirror reflex camera according to claim 1, including tension springs arranged in said two other rollers which are arranged in the lower part of said camera casing.

3. A mirror reflex camera according to claim 1, in which said two scanning means are arranged in the lower part of the camera, whereby said first scanning means is adapted to engage a scanning mark for arresting the film advance, and said second scanning means is adapted to engage a mark indicating the film speed on the lower portion of said film cartridge when the latter is inserted upside down into said camera casing.

References Cited

UNITED STATES PATENTS

| 3,135,183 | 6/1964 | D'Oplinter | 95—31 |
| 3,138,084 | 6/1964 | Harvey | 95—31 |
| 3,232,198 | 2/1966 | Van Breemen | 95—57 |
| 3,312,158 | 4/1967 | MacMillin et al. | |
| 3,347,142 | 10/1967 | Steisslinger | 95—31 |

JOHN M. HORAN, *Primary Examiner.*

CHARLES B. FUNK, *Assistant Examiner.*

U.S. Cl. X.R.

95—31, 42